May 14, 1946.    J. F. DAUSTER    2,400,076
AIR PURIFYING AND FILTERING APPARATUS
Filed Aug. 12, 1939
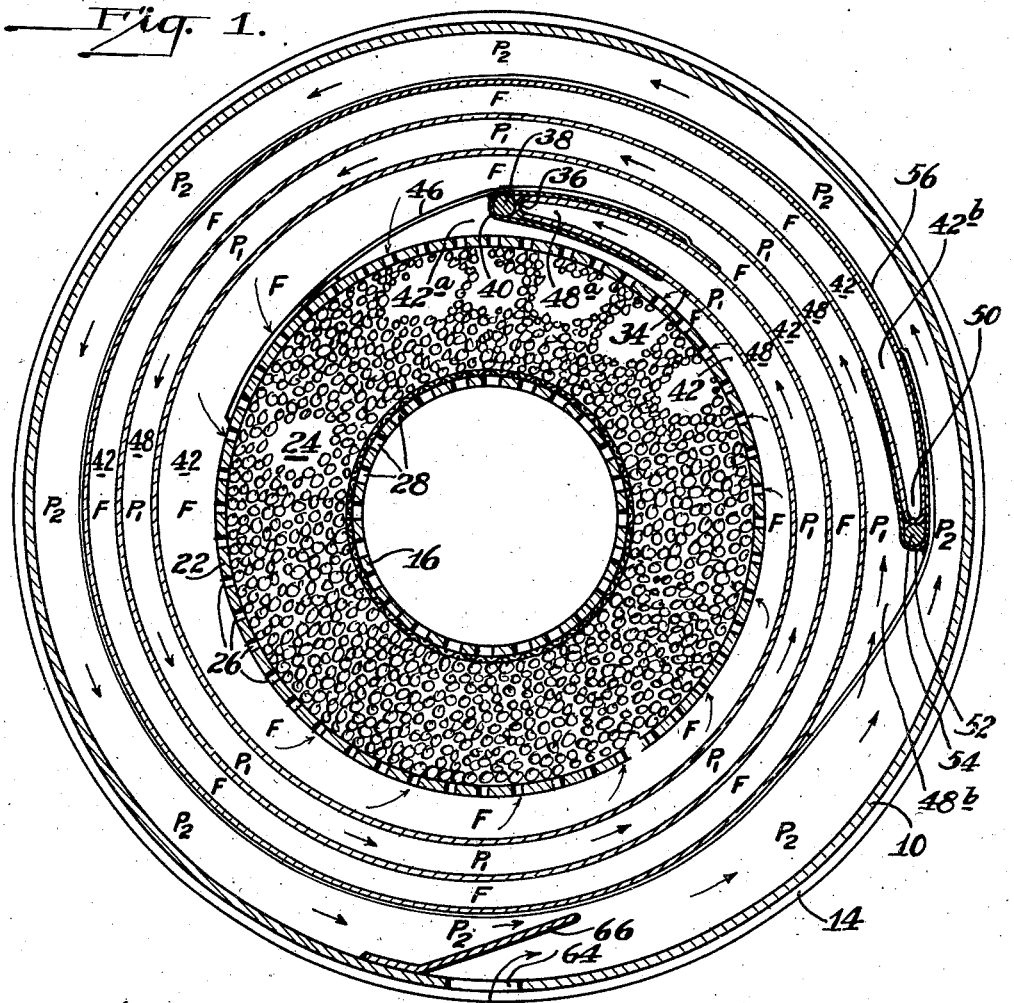
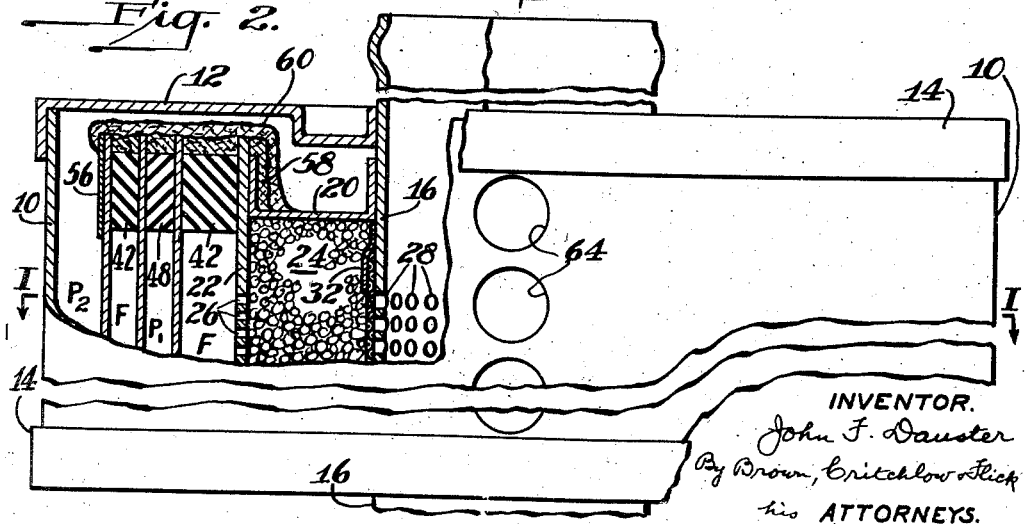
INVENTOR.
John F. Dauster
By Brown, Critchlow & Flick
his ATTORNEYS.

Patented May 14, 1946

2,400,076

UNITED STATES PATENT OFFICE 2,400,076

AIR PURIFYING AND FILTERING APPARATUS

John F. Dauster, Wilkinsburg, Pa., assignor to Mine Safety Appliances Company, Pittsburgh, Pa., a corporation of Pennsylvania Application August 12, 1939, Serial No. 289,793

4 Claims. (Cl. 183—44)

This invention relates to air purifying and filtering apparatus and is more particularly concerned with a canister or like unit adapted to be associated with the face-piece of a gas mask or similar apparatus.

It is old in the art to combine an air purifying element for removing toxic or harmful gases from air with a filtering element for removing dust and other harmful or toxic solids from air. Usually, the combination of an air purifying element and a filtering element takes the form of a substantially cylindrical canister, such as shown in Dym Patent No. 2,063,990, having laterally positioned air intake openings and an axially positioned tube from which the purified air is taken to the breathing apparatus. Apparatus of the indicated type is generally satisfactory but with the present day increased demand for inexpensive and efficient air purifying and filtering apparatus of a character adapted to be used with the minimum of discomfort there are certain features in known apparatus which are susceptible to improvement.

It is the general object of my invention to provide a simplified, relatively inexpensive but rugged and efficient air purifying and filtering apparatus which offers a minimum of breathing resistance.

Another and more specific object of my invention is the provision of an air purifying and filtering canister including a one-piece axially positioned air withdrawal tube whereby production costs are reduced and an improved and stronger structure is provided.

Another object of my invention is to provide an air purifying element containing a body of air purifying material which is so contained and constructed that "channeling" of the air flow through the body is eliminated even though the purifying material packs down in use.

Another object of my invention is the provision of a filtering element in combination with an air purifying element, said filtering element offering a minimum of resistance to air flow and a maximum filtering area for a given canister size.

Another object of my invention is to provide a filtering element of the character described which can be directly secured to the outside of a casing containing a body of air purifying material and wherein the spacing means between spirally wound convolutions of the filter element function also to space the filter element from the air purifying casing.

Another object of my invention is the provision of improved means for mounting a spirally wound strip of filter material in a canister including an air purifying chemical chamber.

Another object of my invention is the provision of improved means for sealing a filtering element around a chamber containing air purifying material.

The foregoing and other objects of my invention are achieved by the apparatus hereinafter described in detail in conjunction with the accompanying drawing.

In the drawing, Fig. 1 is a horizontal cross-sectional view through a canister constructed in accordance with the principles of my invention and taken on the line I—I of Fig. 2; and Fig. 2 is a side elevation of the canister illustrated in Fig. 1 but with a corner of the canister being broken away to illustrate the details of construction.

In accordance with the usual practice the air purifying and filtering apparatus of my invention is housed in a canister or casing 10 of substantially cylindrical shape which is covered or closed at its top and bottom by caps 12 and 14. The caps 12 and 14 are formed with flanged central openings in which an axially extending tube 16 is sealed. The tube 16 is made in a single piece which not only strengthens it but reduces its manufacturing costs. The ends of the tube 16 extend somewhat above and below the caps 12 and 14 to permit hose or other conduits to be secured thereto in the usual manner.

The tube 16 which acts as the withdrawal port for the flow of air through the canister serves as a support for the air purifying element and for the filtering element. Specifically, the numeral 20 indicates a flanged disc which is secured to the tube 16 in air-tight relation immediately below the cap 12 in the manner shown in Fig. 2. A similar disc is secured to the tube 16 in an inverted position immediately above the cap 14. Secured to and surrounding the discs 20 is a cover 22 of cylindrical shape which together with the tube 16 and the discs 20 define a chamber which receives a body of air purifying chemical 24 of any suitable and known type for removing toxic or harmful gases from air passed through the material. The elements described so far comprise the air purifying element hereinabove and hereinafter referred to as a whole.

The cover 22 and the tube 16 are provided with flow holes 26 and 28 to permit the flow of air into, through and out of the body of air purifying material 24. It will be noted that the holes 26 and 28 are spaced from the discs 20 a sufficient distance so that even if the material 24 packs down in use there can be no "channeling" of the air flow which would prevent the air from flowing through the body of the air purifying material. In other words, the holes 26 and 28 are placed at least a quarter of an inch and some times more from the discs 20 so that even if the material 24 would settle a maximum amount, for example, an eighth of an inch or somewhat more during the use of the canister, air flowing from holes 26 to holes 28 would pass through the body of the material 24 rather than "channeling" over the top of the body. The holes 28 are made sufficiently small so that none of the material 24 can escape through them. Conveniently, the holes 28 are made somewhat larger than the holes 26 and in order to prevent the escape of the material 24 through the holes 28 a covering sheet of foraminous material, such as a wire screen, is wrapped around the tube 16 and is held in place by tapes 32 or other suitable means.

My improved filtering element comprising adjacent filtered and unfiltered air passages, as hereinafter described, surrounds and is normally secured directly to the cover 22 of the air purifying element. Usually, my filtering element is built up from a single long strip 34 of filtering material which is of a fibrous nature well known to the art. I take the strip of filtering material 34 and fold it transversely on itself with the fold, indicated at 36, being made to one side of the middle of the strip. For strengthening purposes, a wire or rod 38 is secured to the back of the fold 36 by a strip of adhesive tape 40. The folded strip 34 of filtering material is then wrapped spirally around the cover 22 in the manner shown in Fig. 1 to provide a passage F for filtered air and passages $P_1$ and $P_2$ for unfiltered air.

A spacing member 42, conveniently made of rubber, and positioned along each edge of the strip 34, spaces the strip from the cover 22 and from itself in the filtered air passage F. The end 42a of the spacer member 42 is formed with a shoulder which receives the wire 38 and fold 36 of the strip 34 and is tapered off to a point in the manner shown in Fig. 1. From this same figure of the drawing it will be seen that the spacer member 42 extends somewhat over twice around the cover 22 in a spiral path. The spacer 42 from the end 42a may be increased gradually in thickness to approximately its midpoint and then decreased gradually in thickness to its reduced end 42b. Narrow strips of adhesive tape 46 placed at the top and bottom edges of the strip 34 secure the spacer member 42 and the strip 34 of filtering material to the cover 22.

A spacing member 48 similar to the member 42 is provided at the top and bottom edges of the strip of filtering material 34 between the folded portions of this strip. One end 48a of the spacer member 48 extends into the fold 36 in the strip 34 and from the end 48a the spacer member 48 may be gradually increased in thickness until beyond the middle of its length and then it may be reduced somewhat in thickness until it is terminated in the enlarged portion 48b. It will be seen that the spacing member 48 runs spirally approximately one and one-quarter times around the cover 22.

The shorter side of the folded strip of filtering material 34, which is also the outer side, terminates at the point 50. The longer side of the strip of filtering material continues once more around the canister and also terminates at the point 50 which is at the end 42b of the spacer 42. The ends of the strip 34 at the point 50 are covered with a wide strip of adhesive tape 52 which also encloses a wire 54. Narrow strips 56 of adhesive tape positioned at the top and bottom of the canister extend completely around the filtering element and secure the spacing members 42 and 48 and the individual convolutions of the filtering strip 34 together and to the cover 22 of the air purifying chamber.

I seal the ends of the filtering element by placing a prime coat 58 of latex base sealing compound over the ends in the manner shown in Fig. 2 and then cover this prime coat with a coat 60 of rubber base sealing compound.

A row of holes 64 provided along one side of the canister 10 serves as an air inlet to the canister which inlet does not extend radially outwardly of the outer periphery of the canister. I provide a baffle plate 66 on the inside of the canister 10, in the manner shown in Fig. 1, for directing flow of air into the canister.

In the use of the improved filtering and air purifying apparatus of my invention air withdrawn from the tube 16 causes a flow of air to be purified in through the intake holes 64 and, in the manner shown by the arrows, this air is directed by the baffle 66 circularly of the canister. The air flows through unfiltered air passages $P_1$ or $P_2$. The passage $P_2$ opens into the passage $P_1$ which dead ends at the fold 36. It will be seen that the passages $P_1$ and $P_2$ provide a relatively large surface bounded by the strip 34 of filtering material and that at any point in this large area the air to be filtered can pass into the adjacent filtered air passage F extending over twice around the canister and terminating in a filtered air chamber which surrounds the cover 22 of the air purifying chamber. Thus, once the air has passed into the filtered air passage F it can pass in the manner shown by the arrows directly through the body 24 of purifying material and out through the tube 16 to the face-piece of a gas mask or other breathing apparatus.

From the foregoing it will be recognized that the objects of my invention have been achieved by the provision of an improved air filtering and purifying apparatus of the canister type. Particularly, an apparatus has been provided in which breathing resistance is at a minimum and which is simple and inexpensive but rugged and efficient in use. The one-piece construction of the axially positioned tube in the canister not only strengthens the canister as a whole but reduces its cost of manufacture. "Channeling" of air flow is prevented by positioning air flow holes remote from the ends of the chamber containing chemicals. The construction and attachment of the filtering element directly to the air purifying element is advantageous and the sealing of the filtering element is positive. The spacing means for the filtering element not only provide spacing between the spiral convolutions of the strip 34, but also serve to space the filtering element from the air purifying element which further simplifies and strengthens the construction.

While in accordance with the patent statutes I have particularly illustrated and described my invention, it will be understood that I am not to be limited thereto or thereby but that the scope of my invention is defined in the appended claims.

I claim:

1. A filtering unit which comprises a single strip of fibrous filtering material folded transversely back on itself and coiled in a spiral to provide a spiral unfiltered air passage extending more than a complete circle and an adjacent spiral filtered air passage extending more than a complete circle, a spacing and sealing member in the filtered air passage along each edge of the strip, and a spacing and sealing member in the unfiltered air passage along each edge of the strip, a wire rod along the transverse fold of the strip and secured thereto with a tape, a wire rod along the outer end of the filtered air passage and secured thereto with a tape, an indented shoulder in each first-named sealing member receiving the first-named wire rod, and band means securing the filtering unit together.

2. Air filtering apparatus comprising walls of fibrous sheet material adapted to be positioned around a central member and defining a spiral unfiltered air passage extending more than a complete circle and also defining a spiral filtered air passage extending more than a complete circle, the filtered air passage terminating in a filtered air chamber adapted to substantially completely surround said central member, the unfiltered air passage terminating in a closure, a pair of flexible spacer members spacing the edges of the walls of fibrous sheet material from each other in the filtered air passage and adapted to space said edges from said central member, a pair of flexible spacer members spacing the edges of the walls of fibrous sheet material from each other in the unfiltered air passage, and wire strengthening means for securing the walls of fibrous sheet material in position adjacent the outer end of the filtered air passage and adjacent the inner end of the unfiltered air passage.

3. Air filtering apparatus comprising walls of fibrous sheet material positioned around a substantially cylindrical member and defining a spiral unfiltered air passage extending more than a complete circle, and defining also a spiral filtered air passage extending more than a complete circle, the filtered air passage terminating in a filtered air chamber substantially completely surrounding the cylindrical member, the unfiltered air passage terminating in a closure, a pair of flexible spacer members spacing the edges of the walls of fibrous sheet material from each other in the filtered air passage and from the cylindrical member in the filtered air chamber, and a pair of flexible spacer members spacing the edges of the walls of fibrous sheet material from each other in the unfiltered air passage, the spacer members in the filtered air passage gradually increasing in thickness from their inner ends around said cylindrical member for substantially a complete turn and then tapering toward their outer ends.

4. Air filtering apparatus comprising a hollow central member, walls of fibrous sheet material positioned around the central member and defining a spiral unfiltered air passage, and defining also a spiral filtered air passage, the filtered air passage terminating in a filtered air chamber substantially completely surrounding the central member, the unfiltered air passage terminating in a closure, flexible spacer members spacing the edges of the walls of fibrous sheet material from each other in the filtered air passage and from the central member in the filtered air chamber, flexible spacer members spacing the edges of the walls of fibrous sheet material from each other in the unfiltered air passage, a latex base sealing compound sealing the edges of the air passages, and a covering layer of rubber base sealing compound over the latex base compound.

JOHN F. DAUSTER.